United States Patent
Harutyunyan et al.

(10) Patent No.: US 9,957,168 B2
(45) Date of Patent: May 1, 2018

(54) METHOD FOR SYNTHESIS OF RUTHENIUM NANOPARTICLES WITH FACE-CENTERED CUBIC AND HEXAGONAL CLOSE-PACKED STRUCTURES

(71) Applicant: Honda Motor Co., Ltd., Tokyo (JP)

(72) Inventors: Avetik Harutyunyan, Columbus, OH (US); Nam Hawn Chou, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/201,852

(22) Filed: Jul. 5, 2016

(65) Prior Publication Data

US 2016/0311028 A1    Oct. 27, 2016

Related U.S. Application Data

(63) Continuation-in-part of application No. 14/794,931, filed on Jul. 9, 2015.

(Continued)

(51) Int. Cl.
*C01G 55/00* (2006.01)
*B22F 9/24* (2006.01)
(Continued)

(52) U.S. Cl.
CPC ............ *C01G 55/00* (2013.01); *B01J 23/462* (2013.01); *B01J 35/006* (2013.01);
(Continued)

(58) Field of Classification Search
CPC ................................ C01G 55/00; B01J 23/462
See application file for complete search history.

(56) References Cited

U.S. PATENT DOCUMENTS 6,756,025 B2    6/2004    Colbert et al.
7,396,798 B2    7/2008    Ma et al.
(Continued)

FOREIGN PATENT DOCUMENTS

JP    WO 2013038674 A1 *    3/2013    ............. H01M 4/92
JP    2016159225 A *    9/2016

OTHER PUBLICATIONS

Chung, Sang-Ho, et al. "Highly dispersed ruthenium nanoparticle-embedded mesoporous silica as a catalyst for the production of γ-butyrolactone from succinic anhydride." Journal of nanoscience and nanotechnology 13.11 (2013): 7701-7706.*

(Continued)

*Primary Examiner* — Richard M Rump
(74) *Attorney, Agent, or Firm* — Armstrong Teasdale LLP (57) ABSTRACT

The present disclosure provides for methods for preparing ruthenium nanoparticles characterized by face centered cubic crystallographic structure characterized by small particle size, substantially homogeneous particle size distribution, substantially uniform spherical shape, and substantial high temperature stability. The present disclosure further provides for methods for preparing ruthenium nanoparticles characterized by face hexagonal close packed crystallographic structure characterized by small particle size, substantially homogeneous particle size distribution, substantially uniform spherical shape, and substantial high temperature stability.

21 Claims, 6 Drawing Sheets

Related U.S. Application Data (60) Provisional application No. 62/022,398, filed on Jul. 9, 2014.

(51) Int. Cl.

| | | |
|---|---|---|
| *B01J 23/46* | (2006.01) | |
| *B01J 35/00* | (2006.01) | |
| *B01J 37/04* | (2006.01) | |
| *B22F 1/00* | (2006.01) | |
| *C22B 61/00* | (2006.01) | |
| *B01J 37/03* | (2006.01) | |
| *B01J 37/00* | (2006.01) | |

(52) U.S. Cl.
CPC ....... *B01J 35/0013* (2013.01); *B01J 35/0046* (2013.01); *B01J 37/031* (2013.01); *B01J 37/04* (2013.01); *B22F 1/0044* (2013.01); *B22F 9/24* (2013.01); *C22B 61/00* (2013.01); *B01J 37/0072* (2013.01)

(56) References Cited

U.S. PATENT DOCUMENTS

| | | |
|---|---|---|
| 7,591,989 B2 | 9/2009 | Olivier et al. |
| 7,871,591 B2 | 1/2011 | Harutyunyan et al. |
| 7,879,300 B2 | 2/2011 | Mayne et al. |
| 8,071,906 B2 | 12/2011 | Smiljanic et al. |
| 8,163,263 B2 | 4/2012 | Harutyunyan et al. |
| 2005/0287064 A1 | 12/2005 | Mayne et al. |
| 2008/0102019 A1 | 5/2008 | Jeong et al. |
| 2008/0124482 A1 | 5/2008 | Smiljanic et al. |
| 2008/0226536 A1 | 9/2008 | Smiljanic et al. |
| 2012/0237436 A1 | 9/2012 | Harutyunyan et al. |
| 2014/0377126 A1* | 12/2014 | Kitagawa ............... H01M 4/92 420/462 |
| 2017/0113213 A1 | 4/2017 | Brown et al. |

OTHER PUBLICATIONS

Chakroune, Nassira, et al. "Acetate-and thiol-capped monodisperse ruthenium nanoparticles: XPS, XAS, and HRTEM studies." Langmuir 21.15 (2005): 6788-6796.*

Webelements—Ruthenium. <https://www.webelements.com/ruthenium/crystal_structure.html> Accessed Sep. 22, 2016.*

Yang, J., Jim Yang Lee, and Heng-Phon Too. "A phase transfer identification of core-shell structures in Au—Ru nanoparticles." Analytica chimica acta 537.1 (2005): 279-284.*

Harpeness, R., et al. "Controlling the agglomeration of anisotropic Ru nanoparticles by the microwave-polyol process." Journal of colloid and interface science 287.2 (2005): 678-684.*

Morawa Eblagon, Katarzyna, et al. "Size-controlled preparation of ruthenium nanoparticles using polyaromatic amine-containing compounds as hydrogenation nanocatalyst precursors." International Journal of Nanoparticles 3.2 (2010): 104-122.*

English machine translation of JP2016-159225A (2015).*

Bhaviripudi et al., "CVD Synthesis of Single-Walled Carbon Nanotubes from Gold Nanoparticle Catalysts," JACS, 129(6): 1516-1517 (2007).

Cheng et al., "Large-scale and low-cost synthesis of single-walled carbon nanotubes by the catalytic pryolysis of hydrocarbons," Applied Physics Letters, 72(25): 3282-3284 (1998).

Harutyunyan, A. R. "The Catalyst for Growing Single-Walled Carbon Nanotubes by Catalytic Chemical Vapor Deposition Method," Journal of Nanoscience and Nanotechnology, 9(4): 2480-2495 (2009).

Jiang et al., "A Vapor-Liquid-Solid Model for Chemical Vapor Deposition Growth of Carbon Nanotubes," Journal of Nanoscience and Nanotechnology, 7(4/5): 1494-1504 (2007).

Moisala et al., "Single-Walled Carbon Nanotube Synthesis Using Ferrocene and Iron Pentacarbonyl in a Laminar Flow Reactor," Chemical Engineering Science, 61(13): 4393-4402 (2006).

Nikolaev et al., "Gas-phase catalytic growth of single-walled carbon nanotubes from carbon monoxide," Chemical Physics Letters, 313(1): 91-97 (1999).

Takagi, D. et al., "Single-Walled Carbon Nanotube Growth from Highly Activated Metal Nanoparticles," Nano Letters, 6(12): 2642-2645(2006).

Takagi, D. et al., "Single-Walled Carbon Nanotube Growth from Highly Activated Metal Nanoparticles," Supplemental Information S1-S4 (2006).

Takagi, D. et al., "Carbon Nanotube Growth from Semiconductor Nanoparticles," Nano Letters, 7(8): 2272-2275 (2007).

Ago, Hiroki, et al. "Gas-phase synthesis of single-wall carbon nanotubes from colloidal solution of metal nanoparticles." The Journal of Physical Chemistry B 105.43 (2001): 10453-10456.

* cited by examiner

METHOD FOR SYNTHESIS OF RUTHENIUM NANOPARTICLES WITH FACE-CENTERED CUBIC AND HEXAGONAL CLOSE-PACKED STRUCTURES

CROSS-REFERENCE TO RELATED APPLICATIONS

This application is a continuation-in-part of U.S. patent application Ser. No. 14/794,931, filed Jul. 9, 2015, which claims priority to U.S. Provisional Patent Application Ser. No. 62/022,398, filed Jul. 9, 2014, the contents of which are hereby incorporated by reference in their entireties.

BACKGROUND

The present disclosure relates to methods for producing ruthenium nanoparticles characterized by face-centered cubic or hexagonal closed packed crystallographic structure, small particle size, and a narrow distribution of particle size.

Ruthenium catalysts are increasingly becoming of interest for various applications such as the reduction of carbon monoxide in automobile exhaust gas, steam reforming of shale gas, the selective oxidation of fuel streams for polymer electrolytic fuel cells, and for the generation of various chemical products.

Various processes for producing ruthenium nanoparticles are known. However, the ruthenium nanoparticles prepared by such processes are typically deficient in one or more respects including large particle size, non-homogeneous particle size distribution, agglomerated nanoparticles, nanoparticles that are difficult to disperse, nanoparticles having significant surface contamination, populations of nanoparticles having a large percentage of nanoparticles deviating from an isotropic spherical shape, and/or poor high temperature stability. Such defects limit the catalytic utility and/or efficiency of ruthenium catalysts. It is believed that at least some of these inherent deficiencies of some prior art processes result from a protracted and un-controlled ruthenium nucleation phase that "fixes" a non-homogeneous distribution of nuclei from which ruthenium nanoparticles are formed during a deposition (growth) phase.

Accordingly, there is a need in the art for methods for controllably producing ruthenium nanoparticles having a desired crystallographic structure, small particle size, homogeneous particle size distribution, uniform spherical shape, and temperature stability.

BRIEF SUMMARY

In some embodiments, the disclosure relates to a method of synthesizing ruthenium nanoparticles. The method comprises: preparing a precursor solution comprising a ruthenium precursor compound and glycol; heating the precursor solution to a temperature of from about 90° C. to about 225° C.; adding an acid salt compound reducing agent to the precursor solution form a reaction mixture comprising nucleated ruthenium; incubating the reaction mixture in a growth phase at a temperature of from about 150° C. to about 225° C. to form ruthenium nanoparticles in the reaction mixture; and separating ruthenium nanoparticles from the reaction mixture.

In some other embodiments, the disclosure relates to a method of synthesizing ruthenium nanoparticles with face centered cubic (FCC) crystallographic structure. The method comprises: preparing a precursor solution comprising a ruthenium precursor compound and glycol; heating the precursor solution to a temperature of from about 170° C. to about 225° C.; adding an acid salt compound reducing agent to the precursor solution to form a reaction mixture comprising nucleated ruthenium; incubating the reaction mixture in a growth phase at a temperature of from about 170° C. to about 225° C. to form ruthenium nanoparticles in the reaction mixture, the nanoparticles having FCC crystallographic structure; and separating the ruthenium nanoparticles from the reaction mixture.

In some other embodiments, the disclosure relates to a method of synthesizing ruthenium nanoparticles with hexagonal close packed (HCP) structure. The method comprises: preparing a precursor solution comprising a ruthenium precursor compound and a glycol; heating the precursor solution to a temperature of from about 50° C. to about 120° C.; adding an acid salt compound reducing agent to the precursor solution to form a reaction mixture comprising nucleated ruthenium; incubating the reaction mixture in a growth phase at a temperature of from about 125° C. to about 225° C. to form ruthenium nanoparticles in the reaction mixture, the nanoparticles having HCP crystallographic structure; and separating the ruthenium nanoparticles from the reaction mixture.

The features, functions, and advantages described herein may be achieved independently in various embodiments of the present disclosure or may be combined in yet other embodiments, further details of which may be seen with reference to the following description and drawings.

Although specific features of various implementations may be shown in some drawings and not in others, this is for convenience only. Any feature of any drawing may be referenced and/or claimed in combination with any feature of any other drawing.

DETAILED DESCRIPTION

The subject matter described herein relates generally to methods for preparing ruthenium nanoparticles wherein a plurality of such nanoparticles have an average particle size diameter of less than about 5 nm, and a narrow distribution of particle size diameter. The ruthenium nanoparticles may be further characterized as having a spherical three-dimensional spatial conformation and having surfaces that are essentially free of contaminants, such as surfactants. The subject matter further relates to methods for preparing ruthenium nanoparticles having FCC or HCP crystallographic structure. The ruthenium nanoparticles of the present disclosure provide for high catalytic activity. The ruthenium nanoparticles of the present disclosure further provide for high temperature stability.

The following detailed description illustrates implementations of the subject matter described in this application by way of example and not by way of limitation.

In general, the methods of the present disclosure involve the synthesis of ruthenium nanoparticles by the reduction of ruthenium (III) salt dissolved in a glycol solvent by the addition of a reducing agent (e.g., an acid salt compound) at a particular point in the sequence of synthesis steps to induce a short, rapid and controlled nucleation phase wherein ruthenium nuclei are formed in a "burst", followed by incubating in a growth phase wherein ruthenium nanoparticles are formed by ruthenium deposition onto the nuclei. The selection of variables including ruthenium (III) salt (i.e., ruthenium precursor compound), solvent, reducing agent, sequence of synthesis steps, associated reaction temperatures, and combinations thereof, allows for the selective preparation of monodisperse ruthenium nanoparticles, including ruthenium nanoparticles having FCC or HCP crystallographic structure. The ruthenium nanoparticles of the present disclosure may be characterized as having an average particle size of less than about 5 nm, a narrow particle size distribution, spherical shape, and particle surfaces having low levels of contamination by reaction components, such as surfactants or polymers.

In a first step, a precursor solution is prepared by dissolving a ruthenium precursor compound in glycol. Non-limiting examples of ruthenium precursor compounds within the scope of the present disclosure include ruthenium (III) acetylacetonate ("Ru(acac)$_3$") and ruthenium (III) chloride ("RuCl$_3$.xH$_2$O"). As used herein, glycol refers to a dihydric alcohol (i.e., a diol). Non-limiting examples of glycols within the scope of the present disclosure include ethylene glycol ("EG"), propylene glycol, diethylene glycol, tetraethylene glycol and triethylene glycol ("TEG"). In some particular aspects of the present disclosure, the glycol is EG or TEG. The ruthenium precursor compound concentration in the precursor solution is suitably about 0.5 mmoles per liter, about 1 mmole per liter, about 3 mmoles per liter, about 5 mmoles per liter, about 10 mmoles per liter, about 15 mmoles per liter, about 20 mmoles per liter or about 25 mmoles per liter, and ranges thereof, such as from about 0.5 to about 25 mmoles per liter, from about 1 to about 20 mmoles per liter, from about 1 to about 10 mmoles per liter, or from about 1 to about 5 mmoles per liter, or from about 2 to about 5 mmoles per liter.

In some optional aspects of the present disclosure, prior to reducing agent addition, the ruthenium precursor compound solution may be purged with an inert gas, such as nitrogen, argon or helium, to remove at least a portion of the oxygen and water contained in the solution. Gas flow rate and duration may be suitably selected based on at least the initial oxygen and water content, the desired final oxygen and water content, vessel volume and geometry, and process cycle time considerations. In general, a vigorous purge for about 10 minutes, about 30 minutes or about an hour is suitable.

In a second step, the precursor solution is heated to a temperature of from about 90° C. to about 225° C. An acid salt compound is rapidly added to the heated solution to reduce the ruthenium and induce rapid ruthenium nuclei formation from which a reaction mixture comprising ruthenium nanoparticles is formed by ruthenium deposition onto the nuclei. In some aspects of the disclosure, the acid salt compound is dissolved in glycol (as described herein), for instance, the same glycol compound used for form the ruthenium precursor compound solution. In any of the various aspects of the present disclosure, the concentration of the ruthenium precursor compound in the reaction mixture (i.e., after acid salt compound addition) preferably varies by no more than about 5-50% from that in the ruthenium precursor compound solution. In any of the various aspects of the present disclosure, the mole ratio of acid salt compound to ruthenium in the reaction mixture is preferably about 2:1, about 5:1, about 10:1, about 15:1, about 20:1 or about 25:1, and ranges thereof, such as from about 2:1 to about 25:1, from about 5:1 to about 20:1 or from about 5:1 to about 15:1. In any of the various aspects of the present disclosure, the acid salt concentration in the reaction mixture is from about 10 mmoles per liter to about 100 mmoles per liter or from about 20 mmoles per liter to about 50 mmoles per liter. Non-limiting examples of acid salt compounds within the scope of the present disclosure include sodium acetate and sodium citrate. In some particular aspects, the acid salt compound is sodium acetate. Other reducing compounds are contemplated including sodium borohydride and hydrazine.

The acid salt compound, optionally in solution with glycol, is preferably added rapidly to the ruthenium precursor compound solution at the elevated temperature range to form a reaction mixture comprising ruthenium nanoparticles. In some aspects, the acid salt compound is added to the ruthenium precursor compound solution at about 170° C., about 180° C., about 190° C., about 200° C., about 210° C., about 220° C. or about 225° C., and ranges thereof, such as from about 170° C. to about 225° C. or from about 180° C., about 200° C. In some other aspects, the acid salt compound is added to the ruthenium precursor compound solution at about 100° C., about 105° C., about 110° C., about 115° C., or about 120° C., and ranges thereof, such as from about 100° C. to about 120° C. or from about 100° C. to about 110° C. Without being bound to any particular theory, it is believed that the rapid addition of the acid salt compound reducing agent at elevated temperature induces a ruthenium nucleation burst wherein a large number of solid phase nuclei are essentially spontaneously or essentially instantaneously generated. Nuclei formation may be indicated by an essentially spontaneous or essentially instantaneous color change of the reaction mixture to black. Without being bound to any particular theory, it is believed that rapid nucleation results in the formation of a large number of relatively small nuclei having a generally uniform or homogeneous size distribution and shape. Because a large number of nuclei are generated, it is believed without being bound to any particular theory that subsequent nanoparticle size growth is limited because the ruthenium concentration in solution is depleted and the ruthenium deposition from solution onto nuclei in the growth phase occurs on a large number of nuclei. It is further believed that induction of a nucleation burst may effectively separate the nucleation and growth phases such that the number and size of nuclei are essentially fixed and subsequent simultaneous nucleation and growth is minimized. In contrast, it is believed that simultaneous or overlapping nucleation and growth phases of some prior art methods may result in a wide particle size distribution. By controlling the nucleation phase according to the methods of the present disclosure, it is believed that ruthenium nanoparticle morphology (i.e., spheres), size and size distribution can be controlled. Without being bound to any particular theory, in the present nucleation burst mechanism, it is further believed that the acid salt (e.g., sodium acetate) functions as both a reducing agent and as a stabilizing agent that serves to promote a homogeneous ruthenium nuclei dispersion and therefore inhibit (i) agglomeration during nucleation and growth and (ii) uneven ruthenium deposition during the nucleation and growth phases. It is further believed that the glycol may function to some extent as a reducing agent. In any of the various aspects of the disclosure, the acid salt reducing agent is preferably combined with the ruthenium precursor compound solution as rapidly as possible or practical in order to induce essentially spontaneous or essentially instantaneous ruthenium nuclei formation. Although rates of combination may vary due to volume (e.g., industrial scale versus pilot scale versus lab scale), equipment (pumping rates, agitation rates, agitation efficiency, vessel conformation, etc.) and/or other considerations, the combination of the reducing agent with the ruthenium precursor solution is preferably completed as quickly as practical, such as in less than about 20 minutes, less than about 10 minutes, less than about 5 minutes, less than about 3 minutes or less than about a minute. In any such various combination aspects, a solution color change to black preferably occurs essentially spontaneously in less than about 10 minutes, less than about 5 minutes, less than about 3 minutes, less than about 2 minutes, less than about one minute, or essentially instantaneously. As used herein "nuclei" refer to clusters of ruthenium atoms that form a new phase in a liquid phase. As used herein, "spontaneous" refers to a self-acting reaction occurring when the reaction components reach concentrations sufficient to induce ruthenium nucleation in the reaction system, and without the requirement of addition of external heat to the system. As used herein "instantaneous" refers to the formation of ruthenium nuclei occurring without any purposely induced time delay when the reaction components reach concentrations sufficient to induce ruthenium nucleation in the reaction system.

The rapid nucleation aspect of the present invention provides for improved control of ruthenium nanoparticle size, size distribution and morphology as compared to prior art methods where the ruthenium precursor compound and reducing agent are combined prior to heating to a temperature at which any appreciable rate of nucleation occurs. See, for instance, G. Viau, et al., *Ruthenium Nanoparticles: Size, Shape and Self-Assemblies, Chem. Mater.* 2003, 15, 486-494 and K. Kusada, et al., *Discovery of Face-Centered-Cubic Ruthenium Nanoparticles: facile Size-Controlled Synthesis Using the Chemical Reduction Method, J. Am. Chem. Soc.,* 2013, 135, 5493-5496. In such prior art methods, protracted nucleation occurs during the heating sequence; it is believed that such a protracted nucleation phase results in concurrent, or overlapping, nucleation and growth phases, and a relatively smaller number of nuclei that are characterize by non-homogeneity in terms of size, size distribution and morphology.

After nucleation, the reaction mixture is maintained (incubated) within the previously disclosed temperature range for a time sufficient to complete the growth phase and form ruthenium nanoparticles. In some aspects of the present disclosure, the growth phase temperature is suitably about 140° C., about 150° C., about 160° C., about 170° C., about 180° C., about 190° C., about 200° C., about 210° C., about 220° C. or about 225° C., and ranges thereof, such as from about 140° C. to about 225° C., from about 170° C. to about 225° C., from about 150° C. to about 200° C., from about 180° C. to about 200° C., or from about 150° C. to about 190° C. In some other aspects, the growth phase temperature is suitably about 100° C., about 105° C., about 110° C., about 115° C. or about 120° C., and ranges thereof, such as from about 100° C. to about 120° C., or from about 100° C. to about 110° C. Suitable growth phase times are 30 minutes, 1 hour, 2 hours, 3 hours, 4 hours, 5 hours, or more, and ranges thereof.

After completion of the growth phase, the ruthenium nanoparticulate compounds may be isolated from the reaction mixture. Solid-liquid phase separation methods suitable for the practice of the present invention include, among others, centrifugation, filtration, and gravity separation (settling). In some aspects of the disclosure, the nanoparticles may be washed to remove contaminates. Washing medium within the scope of the present invention includes polar protic solvents including alcohols such as methanol, ethanol and isopropanol. The ruthenium nanoparticles may optionally be further processed by ligand exchange, as described in more detail herein.

In any of the various aspects of the disclosure as described in more detail herein, a plurality of ruthenium nanoparticles of the present disclosure may be generally characterized as having (i) an average diameter of less than 5 nm, (ii) a particle size distribution such that at least 90%, at least 95% or at least 98% of the nanoparticles have a diameter within ±0.5 nm of the average and (iii) a spherical conformation.

The ruthenium nanoparticles of the present disclosure are believed to provide superior catalytic activity and stability as compared to ruthenium nanoparticles known in the art due to at least reduced surface contamination, the essential absence of agglomeration, small particle size, narrow particle size distribution, and high dispersability. It is further believed that the FCC ruthenium nanoparticles of the present disclosure provide for improved high temperature stability as compared to FCC ruthenium nanoparticles known in the art. For instance, K. Kusada, et al. (*Discovery of Face-Centered-Cubic Ruthenium Nanoparticles: facile Size-Controlled Synthesis Using the Chemical Reduction Method, J. Am. Chem. Soc.,* 2013, 135, 5493-5496) disclose the preparation of FCC ruthenium by dissolution of $Ru(acac)_3$ (at 4.2 mmol per liter) and polyvinylpyrrolidone stabilizer ("PVP") (at 20 mmol per liter) in TEG at room temperature followed by heating to 200° C. and a 3 hour hold period. The FCC ruthenium nanoparticles were disclosed as stable up to 723° K (450°). In contrast, the FCC ruthenium nanoparticles of the present disclosure, are believed to be stable up to at least 800° C.; such high temperature stability is required for high temperature catalytic processes, such as for forming carbon nanotubes. A further problem associated with the Kusada process is the use of PVP that is known to contaminate the nanoparticle surface and present difficulties in removal such that washing and/or by ligand exchange are generally not effective; thus, reduced catalytic activity results.

Preparation of FCC Ruthenium Nanoparticles

In some aspects of the present disclosure, synthetic methods for the preparation of FCC ruthenium nanoparticles with an average size of less than 5 nm and a predominantly uniform particle size distribution are provided. As used herein, "predominantly" means greater than 50%, at least 75%, at least 90%, at least 95%, at least 98% or at least 99% on a population %, w/w %, w/v % or v/v % basis. In general, a ruthenium precursor compound is dissolved in a glycol to form a solution that is heated to a temperature of about 160° C., about 170° C., about 180° C., about 190° C., about 200° C., about 210° C., about 220° C., or about 225° C., and ranges thereof, such as from about 160° C. to about 225° C., from about 170° C. to about 225° C., or from about 180° C. to about 200° C. An acid salt compound reducing agent is then added to the heated solution to form a reaction mixture comprising ruthenium nanoparticles characterized by a FCC crystallographic structure. The FCC ruthenium nanoparticles may be separated from the reaction mixture as described elsewhere herein. In some aspects of the present disclosure, the FCC ruthenium nanoparticles may be further processed such as by washing, ligand exchange, and combinations thereof, to remove impurities and residual surface contaminants.

As described above, suitable ruthenium precursor compounds include Ru(acac)$_3$ and RuCl$_3$.xH$_2$O. In some particular aspects of the present disclosure, the FCC ruthenium nanoparticle precursor compound is Ru(acac)$_3$. As further described above, the glycol for FCC ruthenium nanoparticle preparation is EG or TEG. In yet other aspects, the glycol for FCC ruthenium nanoparticle preparation is TEG. The ruthenium precursor compound concentration in the glycol solution is as described above.

In some further aspects of the disclosure, the FCC ruthenium nanoparticle precursor solution may be heated during the purge to about 50° C., about 75° C., about 100° C., about 125° C., about 150° C., about 155° C. or about 160° C. In some optional aspects, the temperature may be increased to about 50° C., about 75° C. or about 100° C. during a first rapid or vigorous gas purge and then to about 125° C., about 150° C., about 155° C. or about 160° C. during a reduced purge rate.

As previously described, the ruthenium precursor compound solution is heated to a temperature range of most broadly from about 160° C. to about 225° C. whereupon an acid salt compound is rapidly added to the solution to reduce the ruthenium and form a reaction mixture comprising FCC ruthenium nanoparticles. More particularly, the acid salt compound, optionally in solution with glycol, is added rapidly (as previously described) to the ruthenium precursor compound solution at the elevated temperature range to form a reaction mixture comprising ruthenium nuclei. The nucleation and growth mechanism for FCC ruthenium nanoparticles is believed to be consistent with the mechanism postulated above.

After nucleation, the reaction mixture is maintained (incubated) within the previously disclosed temperature range for a time sufficient to complete the growth phase and form FCC ruthenium nanoparticles. Suitable growth phase times are 30 minutes, 1 hour, 2 hours, 3 hours, 4 hours, 5 hours, or more, and ranges thereof. After completion of the growth phase, the FCC ruthenium nanoparticulate compounds may be isolated from the reaction mixture by solid-liquid phase separation methods as described elsewhere herein. In some aspects of the disclosure, the FCC ruthenium nanoparticles may be washed to remove contaminates by methods describe elsewhere herein.

Figure 1:
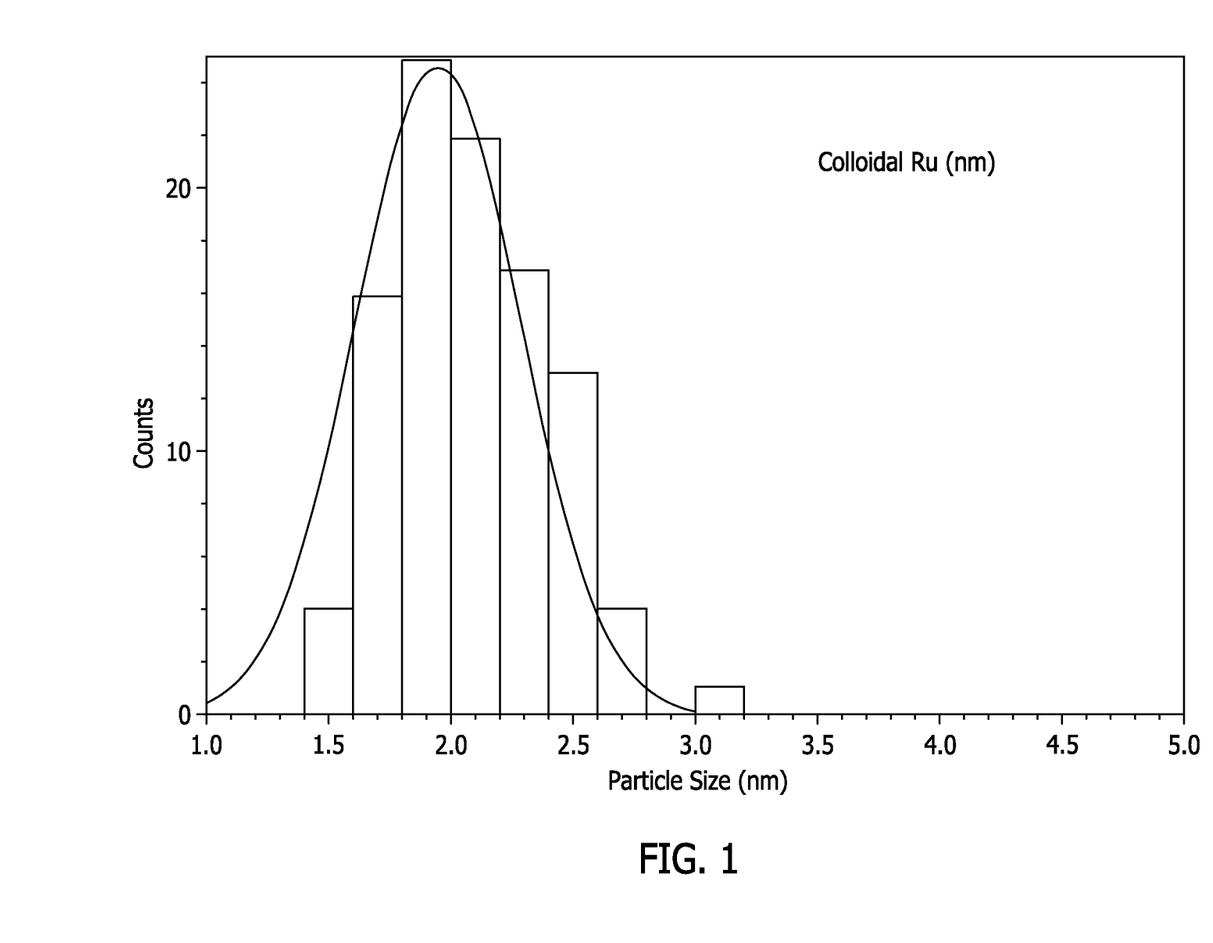
FIG. 1 shows the particle size distribution of colloidal FCC ruthenium nanoparticles prepared according a method of the present disclosure.
Figure 2:
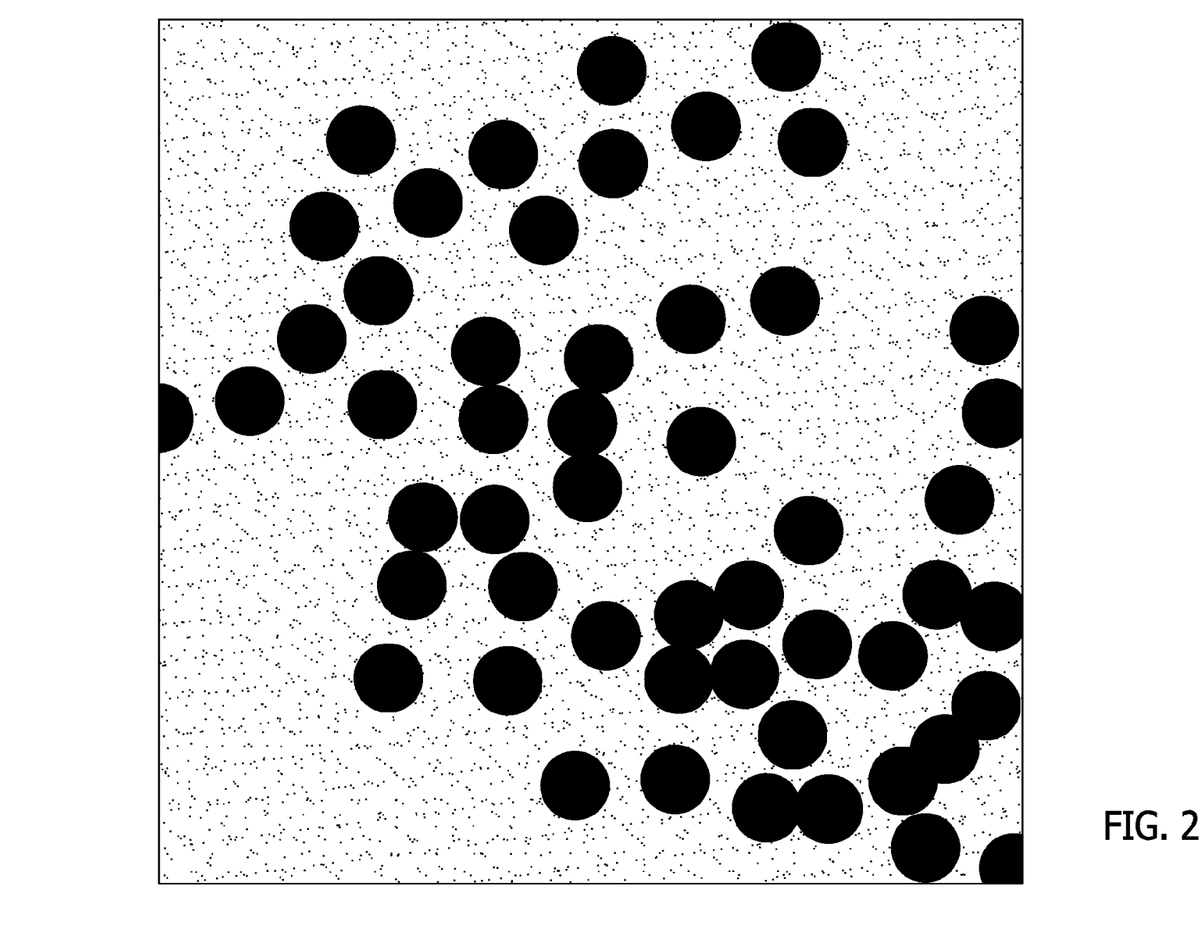
FIG. 2 shows a first transmission electron microscopy image of FCC ruthenium nanoparticles prepared according to a method of the present disclosure.

FCC ruthenium nanoparticles formed by the methods of the present disclosure are characterized by an average diameter of from about 1.3 nm to about 3.3 nm, or from about 1.5 nm to about 2.5 nm, such as about 1.7 nm, about 1.8 nm, about 1.9 nm, about 2 nm, about 2.1 nm about 2.2 nm, about 2.3 nm, about 2.4 nm or about 2.5 nm, and a particle size distribution such that at least 90%, at least 95% or at least 98% of the particles have a diameter within a range of ±0.5 nm of the average particle size diameter. A particle size distribution of FCC ruthenium nanoparticles prepared by a method of the present disclosure is depicted in FIG. 1 wherein the mean particle size is 2.1 nm at a standard deviation of 0.3. Further, at least 90%, at least 95% or at least 98% of a plurality of the nanoparticles exhibit spherical morphology (See FIG. 2 depicting a TEM image of FCC ruthenium nanoparticles prepared by a method of the present disclosure).

Preparation of HCP Ruthenium Nanoparticles

In some aspects of the present disclosure, synthetic methods for the preparation of HCP ruthenium nanoparticles with an average size of less than 5 nm and a predominantly uniform particle size distribution are provided. In general, a ruthenium precursor compound is dissolved in glycol to form a solution that is heated to a temperature of about 90° C., about 95° C., about 100° C., about 105° C., about 110° C., about 115° C., about 120° C., or about 125° C., and ranges thereof, such as from about 90° C. to about 125° C., from about 100° C. to about 120° C., or from about 100° C. to about 110° C. An acid salt compound reducing agent is then added to the heated solution to form a reaction mixture comprising nucleated ruthenium from which ruthenium nanoparticles are formed characterized by a HCP crystallographic structure. The HCP ruthenium nanoparticles may be separated from the reaction mixture. In some aspects of the present disclosure, the HCP ruthenium nanoparticles may be further processed such as by washing, ligand exchange, and combinations thereof, to remove impurities and residual surface contaminants.

HCP ruthenium nanoparticle precursor compounds include Ru(acac)$_3$ and RuCl$_3$.xH$_2$O. In some particular aspects of the present disclosure, the HCP ruthenium nanoparticle precursor compound is RuCl$_3$.xH$_2$O. Glycol solvents are as generally described above. In some particular HCP ruthenium nanoparticle aspects of the present disclosure, the glycol is EG or TEG. In yet other aspects, the glycol is EG. The concentration ruthenium precursor compound concentration in the glycol solution is as described above.

The HCP ruthenium precursor compound solution may be purged, as described above, with an inert gas, such as nitrogen, to remove at least a portion of the oxygen and water contained in the solution. In some further aspects of the disclosure, the solution may be heated during the purge to from about 50° C. to the temperature at which the acid salt compound is added. In some optional aspects, the temperature may be increased to from about 50° C. to about 75° C. during a first rapid or vigorous gas purge and then to the reaction temperature during a reduced purge rate.

As previously described, the ruthenium precursor compound solution is heated to a temperature range of most broadly from about 90° C. to about 125° C. whereupon an acid salt compound is rapidly added to the solution to reduce the ruthenium and form a reaction mixture comprising HCP ruthenium nanoparticles. In any of the various aspects of the present disclosure, the mole ratio of acid salt compound to ruthenium precursor compound is as described elsewhere herein. Acid salt compounds within the scope of the present disclosure include sodium acetate and sodium citrate. In some particular aspects, the acid salt compound is sodium acetate. In some aspects of the disclosure, the acid salt compound is dissolved in glycol (as described herein), for instance, the same glycol compound used for form the ruthenium precursor compound solution. The acid salt compound, optionally in solution with glycol, is added rapidly to the ruthenium precursor compound solution at the elevated temperature range to form a reaction mixture comprising nucleated ruthenium from which ruthenium nanoparticles form. The nucleation and growth mechanism for HCP ruthenium nanoparticles is believed to be consistent with the mechanism postulated above. The combination of the reducing agent with the ruthenium precursor solution is preferably completed as quickly as practical as described elsewhere herein.

After nucleation, the reaction mixture is heated and then maintained within the previously disclosed temperature range for a time sufficient to complete the growth phase and form HCP ruthenium nanoparticles. Suitable growth phase times are 30 minutes, 1 hour, 2 hours, 3 hours, 4 hours, 5 hours, or more, and ranges thereof.

Figure 3:
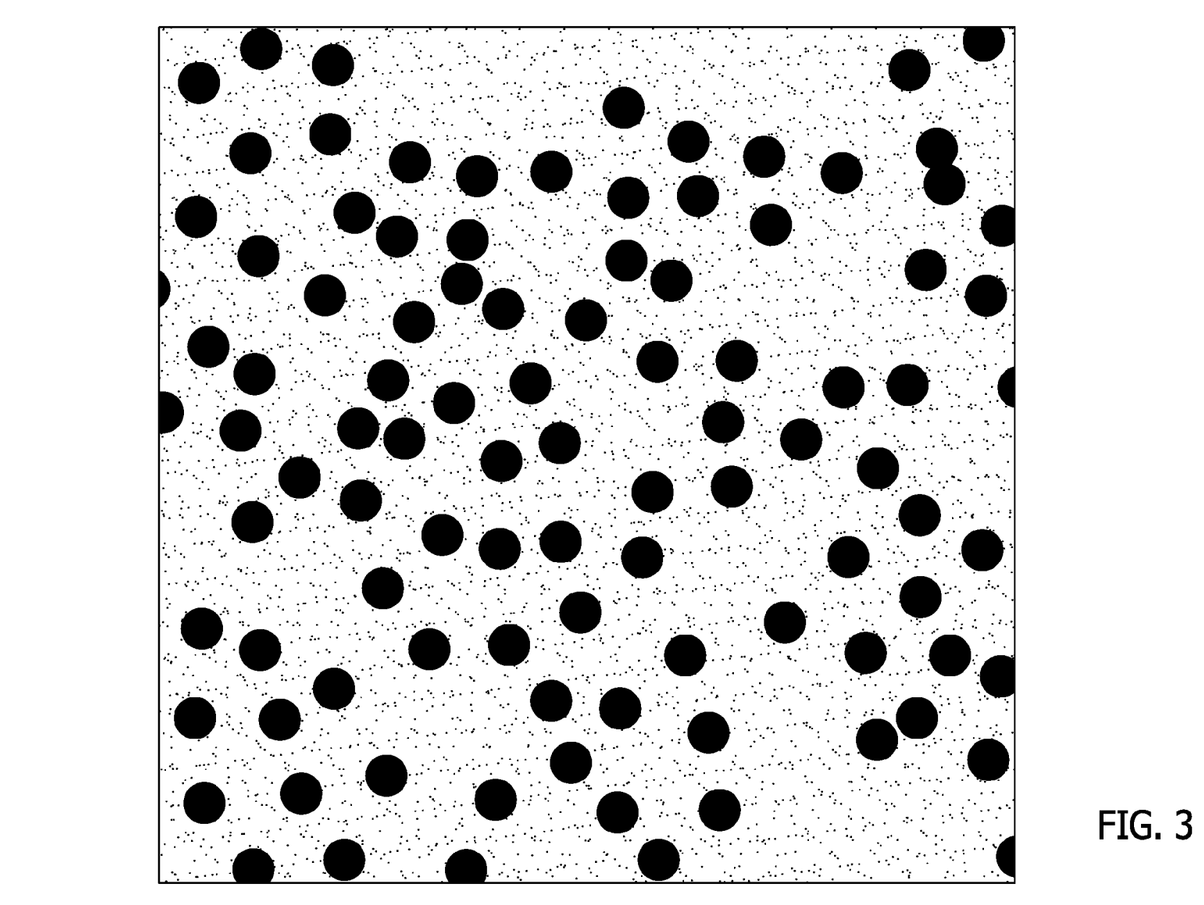
FIG. 3 shows a second transmission electron microscopy image of FCC ruthenium nanoparticles prepared according to a method of the present disclosure.
Figure 4:
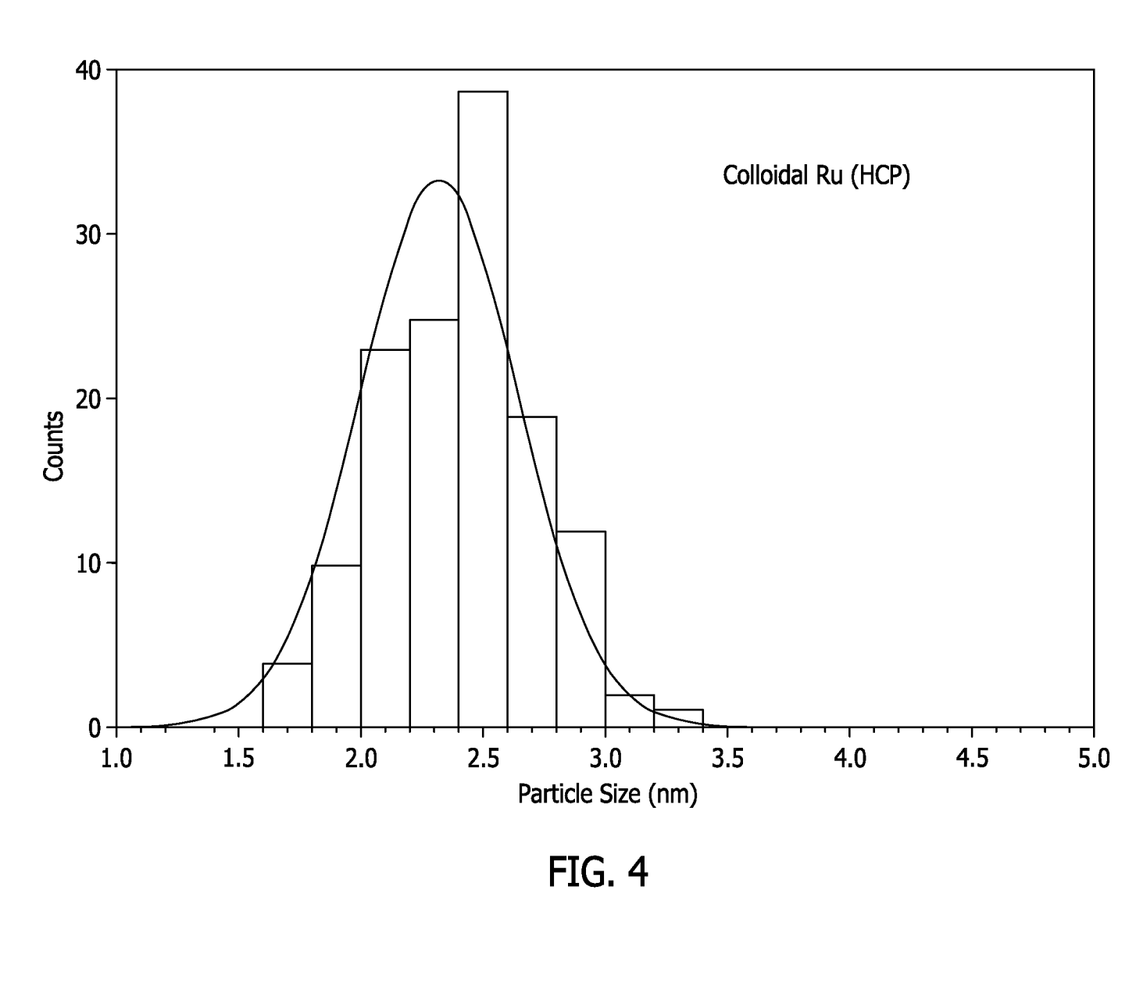
FIG. 4 shows the particle size distribution of colloidal HCP ruthenium nanoparticles prepared according a method of the present disclosure.

HCP nanoparticles formed by the methods of the present disclosure are characterized by an average diameter of from about 1.5 nm to about 3.5 nm, from about 1.7 nm to about 3.2 nm, or from about 1.5 nm to about 2.5 nm, such as about 1.9 nm, about 2 nm, about 2.1 nm, about 2.2 nm, about 2.3 nm about 2.4 nm, about 2.5 nm, about 2.6 nm or about 2.7 nm, and a particle size distribution such that at least 90%, at least 95% or at least 98% of the particles have a diameter within a range of ±0.5 nm of the average particle size diameter. A particle size distribution of HCP ruthenium nanoparticles prepared by a method of the present disclosure is depicted in FIG. 3 wherein the mean particle size is 2.3 nm at a standard deviation of 0.3. Further, at least 90%, at least 95% or at least 98% of a plurality of the nanoparticles exhibit spherical morphology (See FIG. 4 depicting a TEM image of FCC ruthenium nanoparticles prepared by a method of the present disclosure).

Ruthenium Nanoparticle Ligand Exchange

In any of the various aspects of the present disclosure, at least a portion of the surfaces of the ruthenium nanoparticles may be further processed by ligand exchange to remove contaminants, such as organic compounds (e.g., surfactants), from the surface of the nanoparticles. Ruthenium nanoparticles having at least a portion of the surface contaminants removed therefrom are believed to have improved activity, turnover ratio, and catalytic life because a greater area of the active surfaces is exposed and accessible.

Ruthenium nanoparticles or washed nanoparticles are dispersed in an alcoholic solvent system. Suitable alcohols include, for instance, methanol, ethanol and isopropanol. The nanoparticles are then contacted with one or more ligating compounds. Such suitable ligating compounds include oleic acid, oleylamine, octylamine, dodecane thiol, trioctylphosphine, trioctylphosphine oxide, trioctylamine, hexadecylamine, octanethiol, hexylphosphonic acid, tetradecylphosphonic acid, octylphosphonic aciddodecane thiol, sodium bis(2-ethylhexyl) sulfosuccinate, L-glutanthonic acid, and combinations thereof. In some aspects of the disclosure, the ligand compound is oleic acid, oleylamine, dodecane thiol, or a combination thereof. In one particular aspect, the ligand compound is oleic acid and oleylamine. In some aspects of the disclosure, the ligand compound and alcoholic solvent are combined prior to contact with the ruthenium nanoparticle. In any of the various aspects, the ruthenium nanoparticle-ligand dispersion is agitated and optionally sonicated. Total reaction time is suitably about 30 minutes, 1 hour, 2 hours, 3 hours, 4 hours, 5 hours, or longer.

In some aspects of the present disclosure, the dispersion comprises from about 0.05 to about 1 grams per liter, from about 0.1 to about 1 grams per liter, or from about 0.1 to about 0.5 grams per liter ruthenium nanoparticle compound and from about 0.5 to about 25 grams per liter, from about 1 to about 20 grams per liter or from about 5 to about 15 grams per liter ligand compound. In aspects of the present disclosure wherein the ligand compound comprises oleic acid and oleylamine, the oleic acid concentration is suitably from about 1 to about 15 grams per liter, from about 1 to about 10 grams per liter or from about 4 to about 8 grams per liter and the oleylamine concentration is from about 0.5 to about 10 grams per liter, from about 1 to about 10 grams per liter or from about 1 to about 5 grams per liter.

The formed ruthenium nanoparticulate may then be isolated by centrifugation or other solid-liquid separation methods as disclosed herein. In some further aspects, the isolated ruthenium nanoparticulate may be washed with alcohol.

EXAMPLES

Example 1: Preparation of FCC Ruthenium Nanoparticles

Ru(acac)$_3$ (0.04 grams; about 0.1 mmole) was dissolved in 25 mL TEG to form a solution comprising about 3.3 mmoles ruthenium per liter. The solution was vigorously purged with nitrogen with heating until a temperature of about 100° C. was reached and thereafter the purge was continued for about 20 minutes. The nitrogen flow rate was reduced and the temperature was increased to about 155° C. and thereafter the purge was continued for about 10 minutes. The temperature was further increased to about 190° C. whereupon sodium acetate (0.08 grams; about 1 mmole) dissolved in 5 mL TEG was rapidly added to the Ru(acac)$_3$ solution. The reaction solution color immediately changed to black. The reaction solution, comprising FCC ruthenium nanoparticle precipitate, was maintained at about 190° C. for an hour. FCC ruthenium nanoparticles were separated from the reaction solution by centrifugation and the nanoparticles were washed two times with ethanol.

Example 2: Preparation of HCP Ruthenium Nanoparticles

RuCl$_3$.xH$_2$O (0.02 grams; about 0.1 mmole) was dissolved in 25 mL EG to form a solution comprising about 3.3 mmoles ruthenium per liter. The solution was vigorously purged with nitrogen with heating until a temperature of about 50° C. was reached and thereafter the purge was continued for about 10 minutes. The nitrogen flow rate was reduced and the temperature was increased to about 105° C. and thereafter the purge was continued for about 7 minutes. Sodium acetate (0.1 gram; about 1.2 mmole) dissolved in 5 mL EG was rapidly added to the RuCl$_3$.xH$_2$O solution. The solution color immediately changed to black. The reaction solution, comprising HCP ruthenium nanoparticle precipitate, was then heated to about 155° C. and then to about 187° C. The reaction solution was maintained at about 187° C. for 1.5 hours. HCP ruthenium nanoparticles were separated from the reaction solution by centrifugation and the nanoparticles were washed two times with ethanol.

Example 3: FCC and HCP Ruthenium Nanoparticle Ligand Exchange

Approximately half of the washed FCC ruthenium nanoparticles were dispersed in 30 mL of ethanol with oleic acid (0.2 grams; about 0.71 mmoles; 6.7 grams per liter) and oleylamine (0.1 gram; about 0.37 mmoles; 3 grams per liter). The dispersion was sonicated for from about 30 to about 60 minutes, stirred for about 30 minutes, and then sonicated for about 30 minutes. The precipitate was isolated by centrifugation and washed two times with ethanol.

The particle size distribution of colloidal FCC ruthenium nanoparticles prepared according to Examples 1 and 3 (ligand exchange) was analyzed and the results are presented in FIG. 1. Direct measurement of the nanoparticles particle size and distribution can be performed using microscopy methods, such as scanning electron microscopy (SEM) and transmission electron microscopy (TEM). Other techniques for determining mean particle size, such as laser diffraction and scattering can also be used. Laser diffraction scattering particle size distribution measurement apparatus are known in the art and are available commercially such as from Beckman Coulter, Inc. (available under the LS™ series) and from Microtrac Inc. (including S3500, Bluewave and TRI-BLUE). The mean particle size was 2.1 nm and the standard deviation was 0.3. The results show a narrow particle size distribution around the mean and the essential absence of agglomeration.

The FCC ruthenium nanoparticles of Example 3 were imaged by transmission electron microscopy and the results are presented in FIGS. 2 and 3. The TEM image indicates that the nanoparticles are of consistent shape and size (about 2 nm) with essentially all of the particles exhibiting an isotropic spherical shape.

Approximately half of the washed HCP ruthenium nanoparticles were dispersed in 30 mL of ethanol with oleic acid (0.15 grams; about 0.53 mmoles; 5 grams per liter) and oleylamine (0.1 gram; about 0.37 mmoles; 3 grams per liter). The dispersion was sonicated for from about 30 to about 60 minutes, stirred for about 30 minutes, and then sonicated for about 30 minutes. The precipitate was isolated by centrifugation and washed two times with ethanol.

Figure 5:
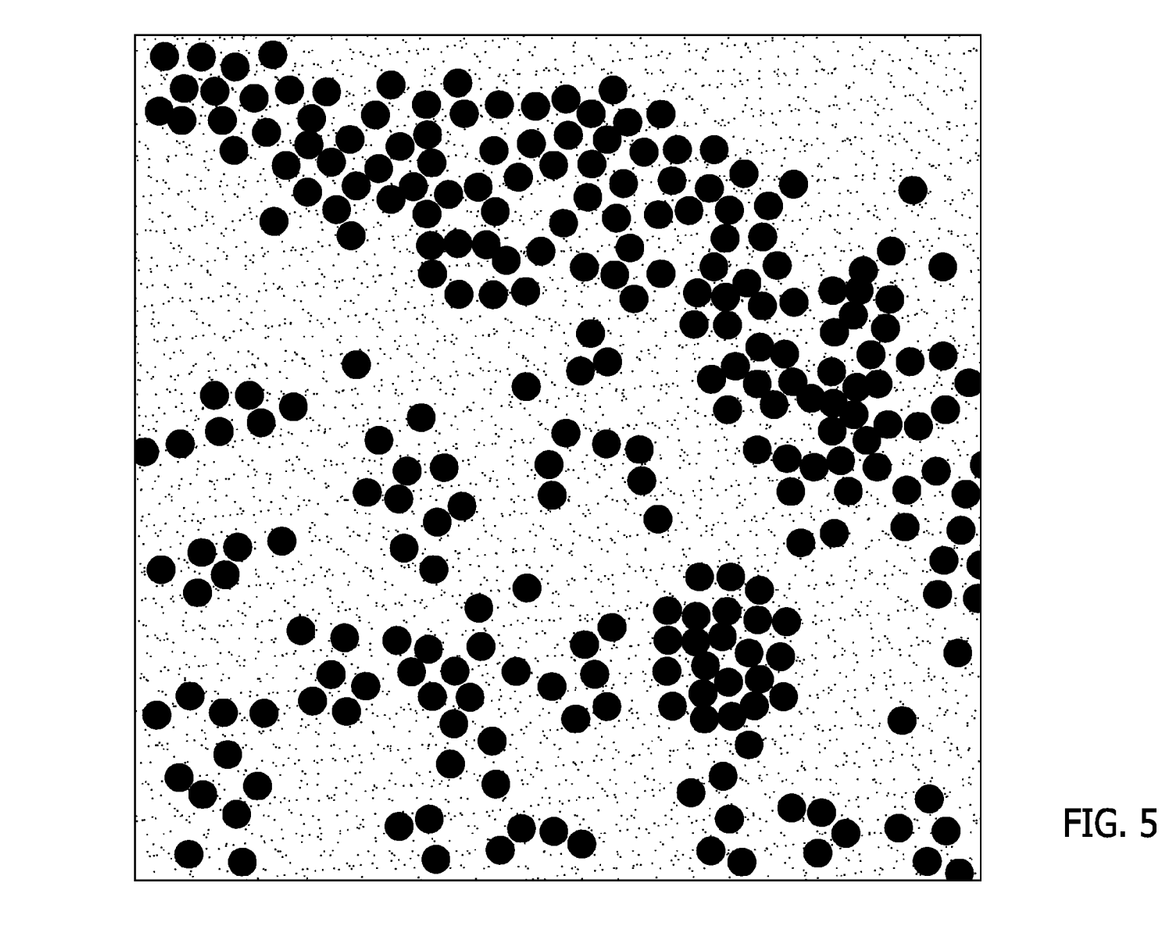
FIG. 5 shows a first transmission electron microscopy image of HCP ruthenium nanoparticles prepared according to a method of the present disclosure.
Figure 6:
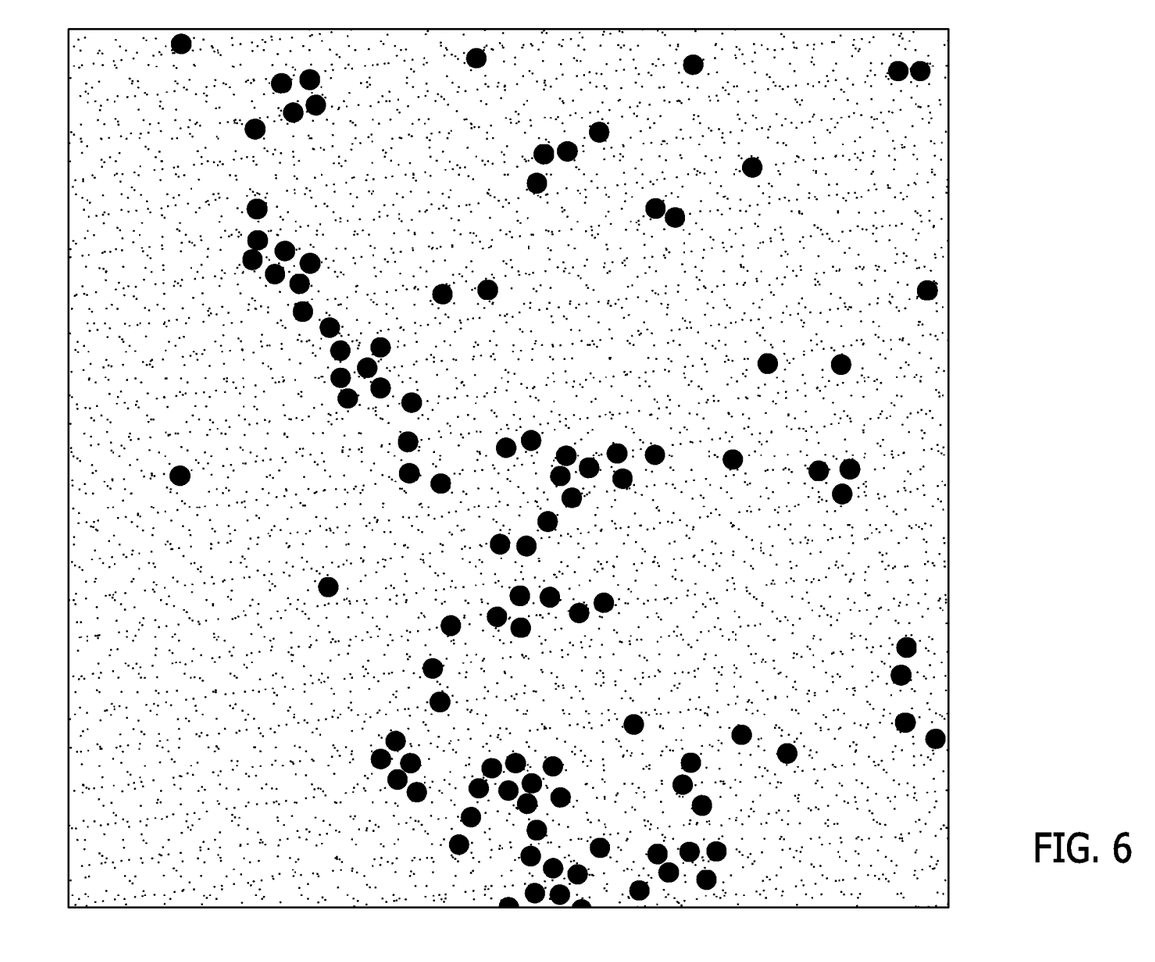
FIG. 6 shows a second transmission electron microscopy image of HCP ruthenium nanoparticles prepared according to a method of the present disclosure.

The particle size distribution of colloidal HCP ruthenium nanoparticles prepared according to Examples 2 and 3 (ligand exchange) was analyzed and the results are presented in FIG. 4. The mean particle size was 2.3 nm and the standard deviation was 0.3. The results show a narrow particle size distribution around the mean and the essential absence of agglomeration The FCC ruthenium nanoparticles of Example 3 were imaged by transmission electron microscopy and the results are presented in FIGS. 5 and 6. The TEM image indicates that the nanoparticles are of consistent shape and size (about 2 nm) with essentially all of the particles exhibiting an isotropic spherical shape.

Methods of producing FCC and HCP ruthenium nanoparticles are described above in detail. The methods are not limited to the specific embodiments described herein, but rather, components of systems and/or steps of the method may be utilized independently and separately from other components and/or steps described herein. Each method step and each component may also be used in combination with other method steps and/or components. Although specific features of various embodiments may be shown in some drawings and not in others, this is for convenience only. Any feature of a drawing may be referenced and/or claimed in combination with any feature of any other drawing.

When introducing elements of the present disclosure or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of synthesizing ruthenium nanoparticles, the method comprising:
   preparing a precursor solution comprising a ruthenium precursor compound and glycol;
   heating the precursor solution to a temperature of from about 90° C. to about 225° C.;
   adding an acid salt compound reducing agent to the precursor solution to form a reaction mixture comprising nucleated ruthenium;
   incubating the reaction mixture in a growth phase at a temperature of from about 150° C. to about 225° C. to form ruthenium nanoparticles in the reaction mixture; and
   separating ruthenium nanoparticles from the reaction mixture.

2. The method of claim 1 wherein the ruthenium precursor compound is selected from the group consisting of ruthenium (III) acetylacetonate, $RuCl_3.xH_2O$, and combinations thereof.

3. The method of claim 1 wherein the acid salt compound is sodium acetate dissolved in a glycol.

4. The method of claim 1 wherein the acid salt compound is added to the precursor solution at a rate sufficient to achieve an essentially spontaneous quantitative formation of ruthenium nanoparticle nuclei as indicated by an essentially instantaneous change in color of the solution to black.

5. The method of claim 1, further comprising a ligand exchange step comprising:
   preparing a suspension comprising the ruthenium nanoparticles, an alcohol solvent, oleic acid, and oleylamine;
   mixing and optionally sonicating the suspension; and
   separating ruthenium nanoparticles from the suspension.

6. The method of claim 1 wherein:
   the ruthenium concentration in the reaction mixture is from about 1 mmole per liter to about 10 mmoles per liter;
   the acid salt concentration in the reaction mixture is from about from about 10 mmole per liter to about 100 mmoles per liter; and
   the mole ratio of acid salt compound to ruthenium in the reaction mixture is from about 5:1 to about 20:1.

7. The method of claim 1 wherein the ruthenium precursor compound is ruthenium(III) acetylacetonate, the glycol is triethylene glycol, the acid salt compound is added to the solution at a temperature of from about from 170° C. to about 225° C., the growth phase temperature is from about 170° C. to about 225° C., and the ruthenium nanoparticles are characterized by face centered cubic (FCC) crystallographic structure having an average diameter of from about 1.3 nm to about 3.3 nm and a particle size distribution such that at least 90% of the particles have a diameter within a range of ±0.5 nm of the average particle size diameter.

8. The method of claim 1 wherein the ruthenium precursor compound is ruthenium chloride, the glycol is ethylene glycol, the acid salt compound is added to the solution at a temperature of from about 100° C. to about 120° C., the growth phase temperature is from about 125° C. to about 225° C., and the ruthenium nanoparticles are characterized by hexagonal close packed (HCP) crystallographic structure having an average diameter of from about 1.5 nm to about 3.5 nm and a particle size distribution such that at least 90% of the particles have a diameter within a range of ±0.5 nm of the average particle size diameter.

9. The method of claim 1 wherein a plurality of the ruthenium nanoparticles are characterized by isotropic spherical morphology.

10. A method of synthesizing ruthenium nanoparticles with face centered cubic (FCC) crystallographic structure, the method comprising:
preparing a precursor solution comprising a ruthenium precursor compound and glycol;
heating the precursor solution to a temperature of from about 170° C. to about 225° C.;
adding an acid salt compound reducing agent to the precursor solution to form a reaction mixture comprising nucleated ruthenium;
incubating the reaction mixture in a growth phase at a temperature of from about 170° C. to about 225° C. to form ruthenium nanoparticles in the reaction mixture, the nanoparticles having FCC crystallographic structure; and
separating the ruthenium nanoparticles from the reaction mixture.

11. The method of claim 10 wherein:
the ruthenium concentration in the reaction mixture is from about 1 mmole per liter to about 10 mmoles per liter;
the acid salt concentration in the reaction mixture is from about from about 10 mmole per liter to about 100 mmoles per liter; and
the mole ratio of acid salt compound to ruthenium in the reaction mixture is from about 5:1 to about 20:1.

12. The method of claim 10 wherein the ruthenium precursor compound is ruthenium (III) acetylacetonate and wherein the acid salt compound is sodium acetate.

13. The method of claim 10 wherein the acid salt compound is added to the solution at a rate sufficient to achieve an essentially spontaneous quantitative formation of ruthenium nanoparticles as indicated by an essentially spontaneous change in color of the solution to black.

14. The method of claim 10, further comprising a ligand exchange step comprising:
preparing a suspension comprising the ruthenium nanoparticles, an alcohol solvent, oleic acid, and oleylamine;
mixing and optionally sonicating the suspension; and
separating ruthenium nanoparticle from the suspension.

15. The method of claim 10 wherein a plurality of the ruthenium nanoparticles are characterized by isotropic spherical morphology, an average diameter of from about 1.5 nm to about 3.5 nm, and by a particle size distribution such that at least 90% of the particles have a diameter within a range of ±0.5 nm of the average particle size diameter.

16. A method of synthesizing ruthenium nanoparticles with hexagonal close packed (HCP) crystallographic structure, the method comprising:
preparing a precursor solution comprising a ruthenium precursor compound and a glycol;
heating the precursor solution to a temperature of from about 50° C. to about 120° C.;
adding an acid salt compound reducing agent to the precursor solution to form a reaction mixture comprising nucleated ruthenium;
incubating the reaction mixture in a growth phase at a temperature of from about 125° C. to about 225° C. to form ruthenium nanoparticles in the reaction mixture, the nanoparticles having HCP crystallographic structure; and
separating the ruthenium nanoparticles from the reaction mixture.

17. The method of claim 16 wherein:
the ruthenium concentration in the reaction mixture is from about 1 mmole per liter to about 10 mmoles per liter;
the acid salt concentration in the reaction mixture is from about from about 10 mmole per liter to about 100 mmoles per liter; and
the mole ratio of acid salt compound to ruthenium in the reaction mixture is from about 5:1 to about 20:1.

18. The method of claim 16 wherein the ruthenium precursor compound is $RuCl_3 \cdot xH_2O$.

19. The method of claim 16 wherein the acid salt compound is sodium acetate dissolved in a glycol.

20. The method of claim 16, further comprising a ligand exchange step comprising:
preparing a suspension comprising the ruthenium nanoparticles, an alcohol solvent, oleic acid, and oleylamine;
mixing and optionally sonicating the suspension; and
separating ruthenium nanoparticles from the suspension.

21. The method of claim 16 wherein a plurality of the ruthenium nanoparticles are characterized by isotropic spherical morphology, an average diameter of from about 1.5 nm to about 3.5 nm and by a particle size distribution such that at least 90% of the particles have a diameter within a range of ±0.5 nm of the average particle size diameter.

* * * * *